March 18, 1947.  R. HEATH  2,417,595

IMPLEMENT HITCH FOR TRACTORS

Filed Dec. 5, 1945  2 Sheets-Sheet 1

INVENTOR.
ROBERT HEATH
BY
Martin E. Anderson
ATTORNEY

March 18, 1947.  R. HEATH  2,417,595
IMPLEMENT HITCH FOR TRACTORS
Filed Dec. 5, 1945  2 Sheets-Sheet 2

INVENTOR.
ROBERT HEATH
BY
Martin E. Anderson
ATTORNEY

Patented Mar. 18, 1947

2,417,595

UNITED STATES PATENT OFFICE 2,417,595

IMPLEMENT HITCH FOR TRACTORS

Robert Heath, Fort Collins, Colo.

Application December 5, 1945, Serial No. 633,005

1 Claim. (Cl. 37—159)

This invention relates to improvements in implement hitches for use with tractors, more especially tractors of the type employing what is known as the "Ferguson system."

The use of tractors operated by internal combustion engines is quite common in all agricultural districts and various means have been provided for effecting connection with different types of implements.

For many purposes scrapers, ditchers and grader blades are necessary to effect soil removal and transportation operations of different kinds, and for other purposes plows, harrows and other ordinary farm implements are required.

When grader blades are used, as, for example, in connection with the leveling of the surface of the ground, in making and cleaning irrigation ditches or in resurfacing roads that are transversely convex, as well as for many other purposes, it is desirable and quite essential that the blade shall be connected with the tractor by means which will impart to it a transverse tilt with respect to a horizontal plane as well as an angular adjustment thereof with respect to the direction of travel.

It is the object of this invention to produce a tractor hitch that shall be so constructed that when a grader blade or other implement is attached thereto, it may be adjusted angularly with respect to the direction of travel, and in which such angular adjustment automatically effects an angular adjustment with respect to a horizontal plane.

Another object of the invention is to produce an implement hitch of such construction that the implement, for example a grader blade, can be adjustably connected thereto by means which permits the blade to be readily disconnected so as to allow the hitch to be employed in connection with other implements.

Another object of the invention is to produce a hitch of the type specified in which a scoop or scraper can be readily substituted for the grader blade and adjusted by the hitch in such a way that the bottom thereof can be inclined transversely with respect to the horizontal plane on which the tractor is moving.

The above and any other objects that may appear as the description proceeds are attained by means of a construction and an arrangement of parts that will now be described in detail and for this purpose reference will be had to the accompanying drawings in which the invention has been illustrated in its preferred form, and in which.

Figure 1:
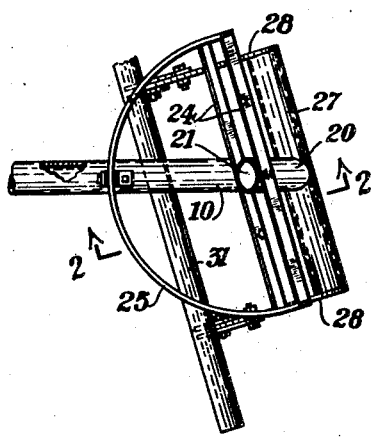
Figure 1 is a top plan view of the improved implement hitch, portions thereof being broken away for clarity.
Figure 2:
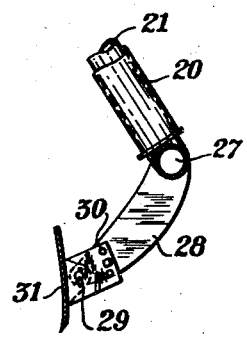
Figure 2 is a fragmentary section taken on line 2—2, Figure 1.
Figure 3:
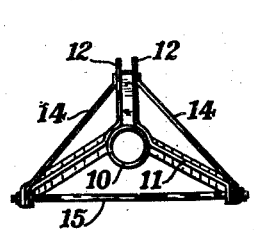
Figure 3 is an end elevation looking through plane 3—3, in Figure 4.
Figure 4:
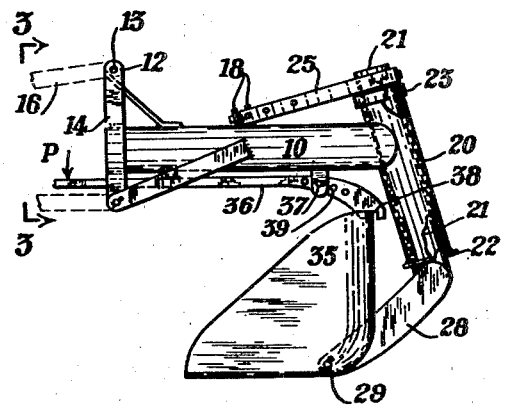
Figure 4 is a side elevation showing a scraper scoop connected with the implement hitch.
Figure 7:
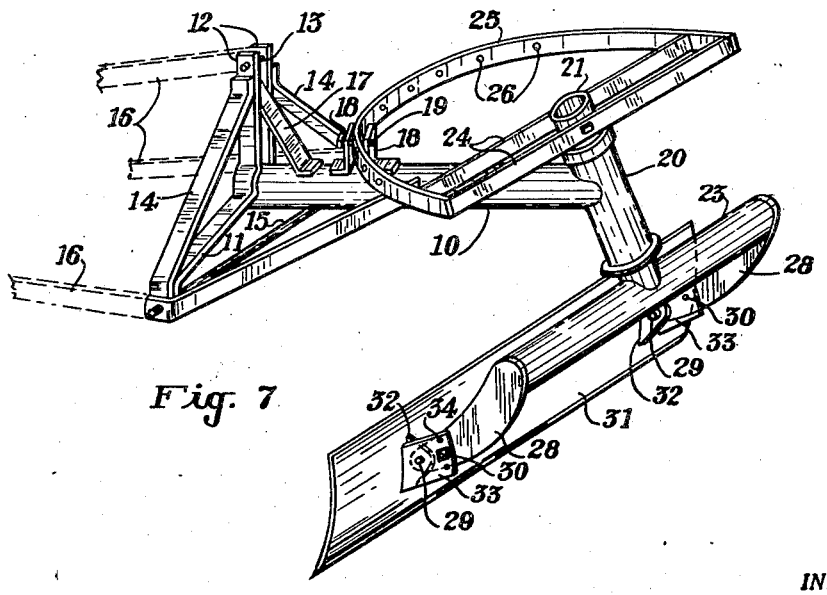
Figure 7 is a perspective view showing the parts in one position.

Referring now to the drawing and more particularly to Figure 7, the hitch that forms the subject of this invention consists of a rigid bar 10 that, in the present instance, is tubular and cylindrical, but which may have any other cross sectional shape. Secured to one end of this bar are arms 11 and 12 that extend from the tubular member substantially 120 degrees apart. The two arms 12 are spaced and provided near their tops with openings for the reception of pivot pins 13. The two arms on each side, 11 and 12, are connected near their ends by diagonal braces 14 and a tension bar 15 connects the two lower ends of arms 11. These arms are connected to the tractor by means of other bars which have been shown by broken lines and indicated by reference numerals 16. The dotted line bars form parts of a mechanism that is sold under the name of "Ferguson system" which system employs hydraulic means for raising and lowering the implement. As this invention has no relation to the particular system, but is merely used in connection with it, the operation of the "Ferguson system" will not be described. A brace 17 is also provided between the upwardly extending arms 12 and the bar 10, as shown in Figure 7. Secured to the upper surface of bar 10 are two spaced angle brackets 18 that have openings for the reception of a pin 19. At the rear end of bar 10 is a tubular bearing 20 which, instead of having its axes perpendicular to the axis of bar 10, is downwardly and rearwardly inclined as shown in Figures 2, 4 and 7. Rotatably mounted in bearing 20 is a shaft 21 that is held against longitudinal movement by means of collars 22 and 23. Two bars 24 are connected to opposite sides of shaft 21 near the top and welded to the ends of these bars is a steel bar 25 bent into a semi-circle having such a radius that it will assume a position between the two brackets 18 as shown in Figures 1 and 7. This arcuate bar has a plurality of openings 26 for the reception of the pin 19. It is evident that the shaft 21 can be adjusted rotatably and latched in adjusted position by means of the arcuate bar 25 and the pin 19.

A cross bar 27 is welded or otherwise secured to the lower end of shaft 21 with its axis perpendicular to the axis of the shaft. Secured to the ends of cross bar 27 are two curved arms 28 that project forwardly in the manner shown quite clearly in the drawings. The ends of arms 28 are provided with openings for pins 29 and other openings for bolts 30. In Figures 1, 2, 5, 6 and 7, a grader blade 31 has been shown secured to arms 28. The blade is provided with two pairs of spaced lugs or ears the inner of which has been designated by reference numeral 32 and the outer by reference numeral 33. The ends of arms 28 project into the space between these lugs and are secured by pins or bolts 29. The outer ends of lugs 33 have several openings 34 so that angular adjustment between the blade and the arms can be effected.

Figure 5:
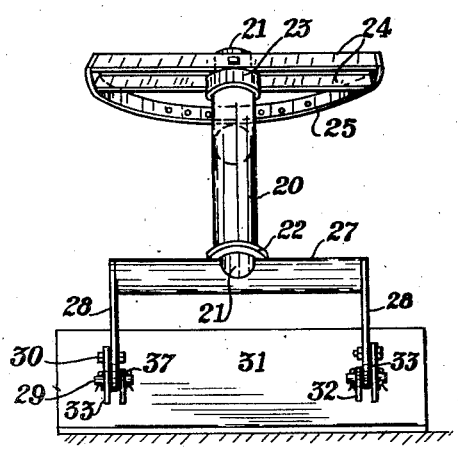
Figure 5 is a rear view of the hitch shown in Figure 1 showing a grader blade connected therewith.
Figure 6:
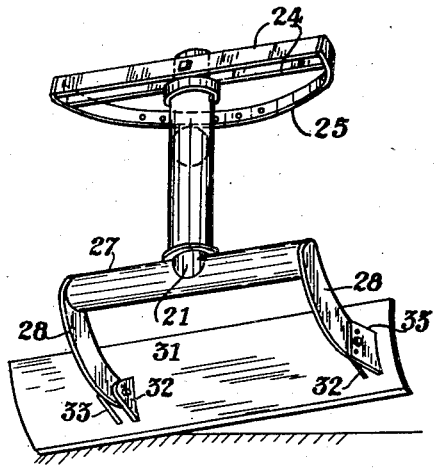
Figure 6 is a view similar to that shown in Figure 5, but shows the grader blade adjusted angularly about an upwardly and forwardly ranging pivot so as to change its angular relation both with respect to the direction of travel and the horizontal plane on which the tractor is moving.

Let us now assume that the parts are so adjusted that the grader blade assumes a position with its edge perpendicular to a vertical plane passing through the axis of bar 10. The lower edge of the grader blade will then be horizontal as shown in Figure 5. If we turn shaft 20 with its blade so as to bring the end of the blade towards the left in Figure 6, ahead of the end of the right, then, due to the fact that the axis on which the blade has been rotated is downwardly and rearwardly inclined, the left-hand end of the blade will tip downwardly as shown in Figure 6. The angular inclination of the edge with respect to a horizontal plane will vary with the extent of its angular adjustment away from the position shown in Figure 5. It is also evident that either end of the blade can be dipped downwardly by rotating the parts in the proper direction for such inclination. It is evident that by the simple expedient of inclining the axis of bearing 20 and shaft 21, an angular adjustment of the grader blade edge with respect to the horizontal plane will be effected whenever its angular relation with the direction of travel is changed. This adjustment is of great importance in many types of operation, as, for example, where irrigation ditches are cut or cleaned or where crowned surfaces of roads are reconditioned.

In Figure 4, a side elevation has been shown in which, instead of a grader blade, a scraper scoop has been attached to the arms so as to tilt about pivots 29. This scoop is held in operative position by means of a latch comprising a lever 36 pivotally attached to bar 10 at 37. The rear end of this lever has a notch 38 that engages the upper edge of the scoop as shown in the drawing. A spring or other suitable means can be provided for holding the lever in operative position and the scoop can be released by exerting a downward pressure on the end of the lever in the direction of arrow P. Lever 36 is provided with a plurality of openings 39 by means of which the inclination of the bottom of the scoop can be varied to obtain the best operative conditions. Due to the inclination of the axis of shaft 21 with respect to bar 10, the transverse inclination of the bottom of the scoop can be adjusted in the manner described in connection with the scraper blade and the scoop can therefore assume a position best suited to obtain the curvature of the earth's surface desired for the particular operation.

The important point of distinction between the implement hitch shown and described herein and the ones that are already known is the downward and rear inclination of the axes of bearing 20 and shaft 21. By means of this simple variation important operative differences result which are of great practical value to farmers and others employing ground working tools of the type mentioned.

Although the invention has been illustrated in the drawings in connection with a blade and a scoop only, it is to be understood that it is not limited to a combination in which these ground working implements are used, but may be employed in connection with other ground working tools where similar adjustments are found to be necessary or desirable.

Although the hitch that has been described above has been designed to be connected with a tractor in a specific way, it is to be understood that arms 11 and 12 and associated parts are intended to illustrate means for attaching the hitch to a tractor and that any other suitable means can be substituted.

Having described the invention what is claimed as new is:

A ground working implement hitch for tractors, comprising, a rigid bar having its front end provided with means for effecting connection with a tractor, the rear end having a bearing whose axis is downwardly and rearwardly inclined, a shaft mounted in the bearing for rotarial adjustment, a beam non-rotatably connected at its center with the upper end of the shaft, an arcuate bar having its ends connected with the beam on opposite sides of the shaft, means carried by the rigid bar for latching the arcuate bar in any desired position, an implement supporting bar secured to the lower end of the shaft in right angular relation thereto and means at the ends of the last named bar for attaching a ground working implement thereto.

ROBERT HEATH.

REFERENCES CITED

The following references are of record in the file of this patent:

UNITED STATES PATENTS

| Number | Name | Date |
| --- | --- | --- |
| 1,774,469 | Brown et al. | Aug. 26, 1930 |
| 2,063,537 | Beard | Dec. 8, 1936 |
| 2,346,757 | Horner | Apr. 18, 1944 |